Figure 1:
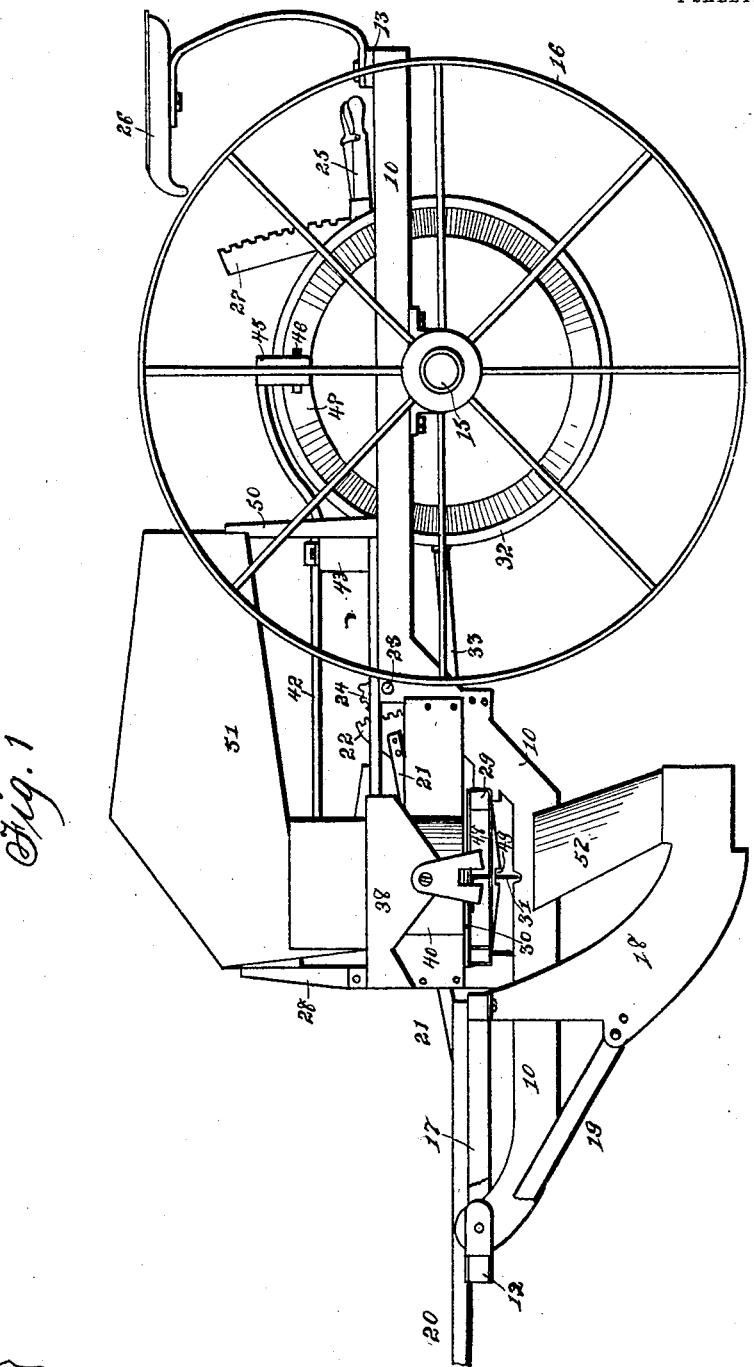

No. 809,396. PATENTED JAN. 9, 1906.
J. J. PUTNEY.
AUTOMATIC POTATO CUTTER AND PLANTER.
APPLICATION FILED FEB. 20, 1905.

4 SHEETS—SHEET 1.

Witnesses: Inventor: John J. Putney,
By Thomas G. Orwig, Attorney.

No. 809,396. PATENTED JAN. 9, 1906.
J. J. PUTNEY.
AUTOMATIC POTATO CUTTER AND PLANTER.
APPLICATION FILED FEB. 20, 1905.
4 SHEETS—SHEET 2.
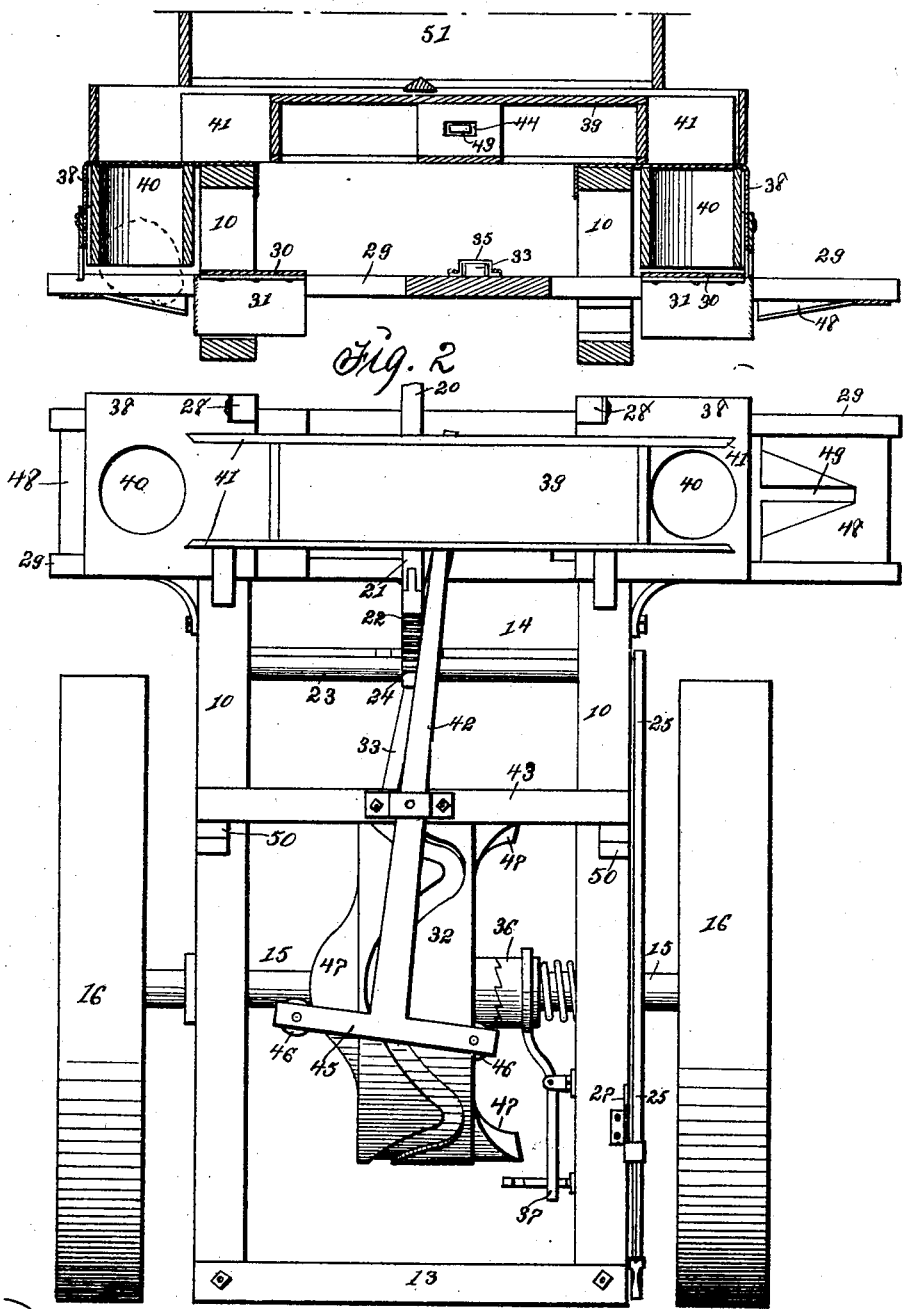
Witnesses:
L. L. Reibock.
F. C. Robey.
Inventor: John J. Putney,
By Thomas G. Orwig, Attorney

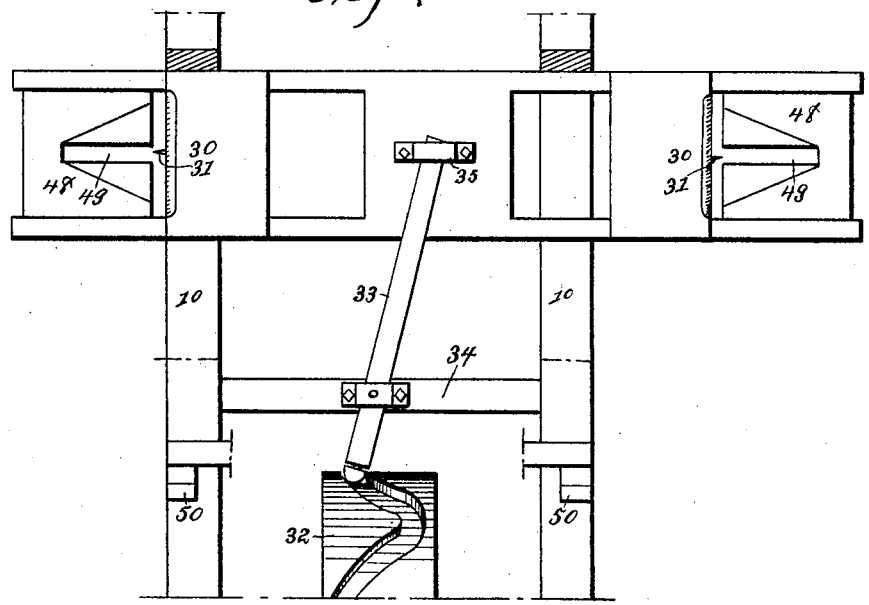
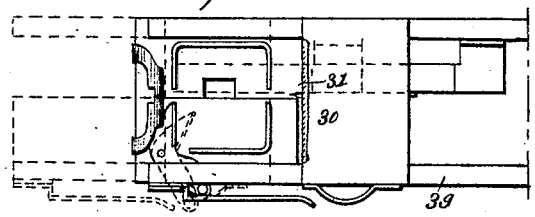
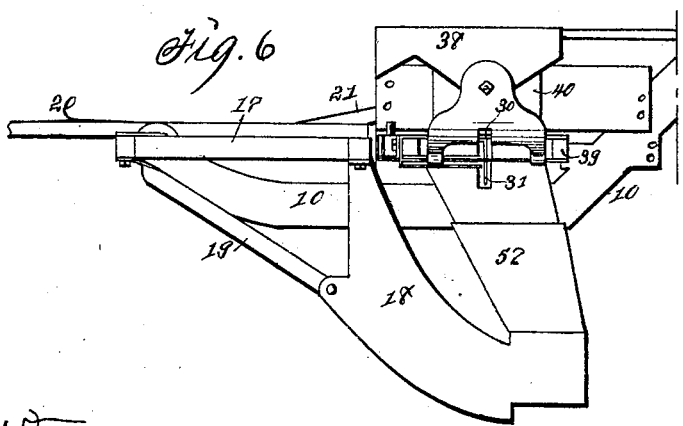

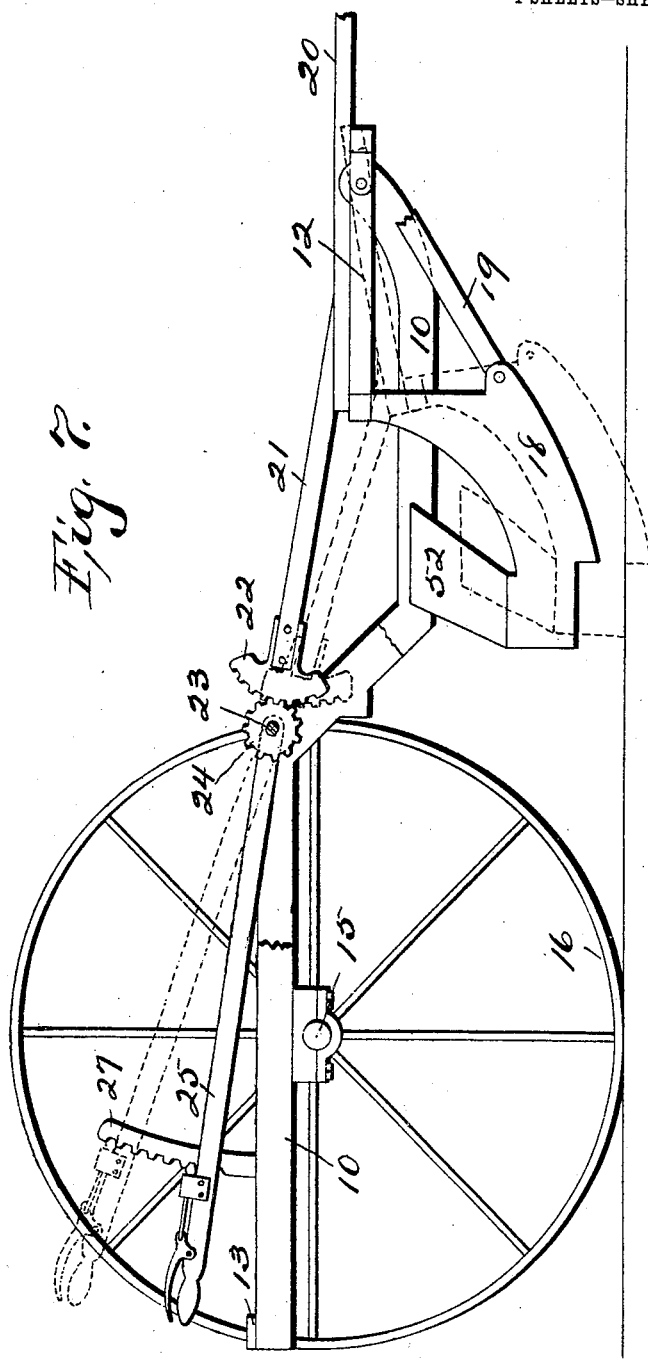

UNITED STATES PATENT OFFICE.

JOHN J. PUTNEY, OF STUART, IOWA.

AUTOMATIC POTATO CUTTER AND PLANTER.

No. 809,396.　　　　　　Specification of Letters Patent.　　　　　　Patented Jan. 9, 1906.

Application filed February 20, 1905. Serial No. 247,044.

*To all whom it may concern:*

Be it known that I, JOHN J. PUTNEY, a citizen of the United States, residing at Stuart, in the county of Guthrie and State of Iowa, have invented a new and useful Automatic Potato Cutter and Planter, of which the following is a specification.

My object is to provide a machine on a carriage-frame adapted to be advanced in a field in the manner of an automatic corn-planter to automatically cut seed-potatoes and plant two parallel rows simultaneously.

My invention consists in the construction, arrangement, and combination of elements and subcombinations, as hereinafter set forth, pointed out in my claims, and illustrated in the accompanying drawings, in which—

Figure 1 is a side view of the machine and shows the positions of operative devices relative to each other and the carriage and runners or furrow-openers. Fig. 2 is a top view of the main or wheel portion of the machine and shows a reciprocating potato-carrier and means for actuating said carrier. Fig. 3 is a transverse sectional view of the potato-carrier and its support and potato-cutters fixed to the support. It also shows the feed-hopper on top of the reciprocating potato-carrier. Fig. 4 is a top view of the reciprocating cutter-carrier that is mounted in a plane below the potato-carrier and shows how it is operated by means of a grooved cam-wheel and a lever. Fig. 5 is a top view, and Fig. 6 a side view, of a modified form of potato-cutting and seed-dropping mechanism. Fig. 7 is a side elevation with parts broken away.

The numerals 10 designate the side pieces of a rear carriage or wheel frame; 12, the front cross-piece; 13, the rear end cross-piece, and 14 a central cross-piece. An axle 15 is rotatably mounted on the rear end portion of the frame and traction-wheels 16 fixed on the ends of the axle. A front or runner frame 17 is pivotally connected with the front ends of the side pieces 10 of the rear or carriage-wheel frame, and runners or furrow-openers 18, adapted to serve as furrow-openers, are fixed to the runner-frame in parallel position. Braces 19 extend from the runner-frame 17, as shown in Fig. 1, in which the upper front end of the brace is broken off. A pole 20 is fixed to the center of the runner-frame 17, and an arm 21 is rigidly fixed to the rear end of the pole and a toothed segment 22 fixed on the free end of said arm to aid in raising and lowering the runner-frame and runners as required to facilitate turning the machine about at the end of a field. A shaft 23 is mounted in bearings on the side pieces 10 of the carriage-frame, and a gear-wheel 24 is fixed to said shaft to engage the segment 22, and a hand-lever 25 is fixed to the end of the shaft in such a manner that a person on the seat 26 can operate the lever as required to raise and lower the runners by imparting motion to the rotary shaft. A rack 27, fixed to the side piece 10 of the frame, and a pawl carried by the lever retain the lever and shaft stationary. Standards 28 are fixed to the sides 10 of the carriage-frame in rear of the runner-frame 17, and a reciprocating frame and cutter-carrier 29 is mounted in rear of said standards. Cutters 30 are fixed on the top and end portions of the said carrier in a horizontal position and cutters 31 in a vertical position in such a manner that the upper cutters 30 will cut potatoes into halves and the lower cutters 31 will quarter the halves when the cutter-carrier is actuated.

To impart rectilinear reciprocating motion to the cutter-carrier 29, a grooved cam-wheel 32 is fixed to the axle 15 and a lever 33, pivoted to a cross-piece 34, fixed to the sides 10 of the carriage-frame and its short arm extended into the cam-groove, and its long arm is slidably and pivotally connected with the cutter-carriers 29 by means of a loop 35, fixed on the top and center of said carrier, as shown in Fig. 4, or in any suitable way. A clutch mechanism 36 is connected with the cam-wheel 32 and the axle 15, as shown in Fig. 2, and as required to make the cam-wheel operative and inoperative by means of a lever 37 within reach of a person on the seat 26. Platforms 38 are fixed to the sides 10 of the carriage-frame to extend outward from the standards 28 for supporting a reciprocating potato-carrier 39, mounted thereon. Open-ended tubular potato-conductors 40 are fixed to the platforms 38 to extend downward for conveying potatoes to the cutters 30 and 31. The potato-carrier, slidably connected with the platforms 38, has parallel extensions 41 at its ends, between which potatoes will drop from a hopper to be pushed by the carrier into the open conductors 40 in the platform 38, as required, to fall into contact with the cutters 30 and 31.

To impart rectilinear reciprocating motion to the potato-carriers 39, a lever 42 is pivoted to a cross-piece 43, fixed to the sides 10 of the carriage-frame, as shown in Fig. 2, and its front end is extended into an aperture 44 in the center of the potato-carrier (shown in Fig. 3) as required to operate said carrier, and the rear end of the lever has a cross-head 45 and rollers 46 journaled thereto for engaging cams 47 on the sides of the grooved cam-wheel 32.

The cutter-carrier 29 has metal plates 48 fixed to its ends and provided with slots 49, and the parallel parts at the side of the slots inclined downward to produce a bed upon which potatoes will lodge, as indicated by dotted lines in Fig. 3, as required to be retained in proper position to be cut into pieces by the reciprocating cutters 30 and 31. Standards 50 are fixed to the side pieces 10 of the carriage-frame and a hopper 51 fixed to the said standards and the standards 28 as required to carry seed-potatoes. The hopper has an inclined bottom that causes the potatoes to roll forward and to drop into the open ends of the carrier as it is reciprocated under the front part of the hopper and to lodge on the platforms 38 until they are cut and the pieces then dropped through the conductors 40 and allowed to fall therethrough into the hollow seed-conveyers 52, fixed on top of the rear ends of the runners 18, to be thereby delivered at regular intervals of time and space into the furrows opened by the runners.

Having thus set forth the purpose of my invention and the construction and function of each operative element and subcombination, the practical operation and utility of the machine will be obvious to persons familiar with the art to which it pertains, and

What I claim as new, and desire to secure by Letters Patent, is—

1. In a potato cutter and planter, a carriage-frame composed of rigid parallel side pieces and cross-pieces mounted upon a rotatable axle, a runner-frame hinged to its front end, a pole fixed to the runner-frame, an arm fixed to the rear end of the pole, a toothed sector fixed to the rear end of the arm, a rotatable shaft mounted on the carriage-frame, a hand-lever fixed to the end of the shaft, a rack fixed to the side of the frame and a pawl carried by the hand-lever to engage the rack, arranged and combined to operate in the manner set forth, for the purposes stated.

2. In a potato cutter and planter, a carriage-frame composed of rigid parallel side pieces and cross-pieces mounted upon a rotatable axle, a runner-frame hinged to its front end, a pole fixed to the runner-frame, an arm fixed to the rear end of the pole, a toothed sector fixed to the rear end of the arm, a rotatable shaft mounted on the carriage-frame, a gear-wheel on said shaft and means for actuating the shaft, standards fixed to the carriage-frame and a hopper having an inclined bottom fixed to the standards, arranged and combined to operate in the manner set forth for the purposes stated.

3. In a potato cutter and planter, a carriage-frame composed of rigid parallel side pieces and cross-pieces mounted upon a rotatable axle, a runner-frame hinged to its front end, a pole fixed to the runner-frame, an arm fixed to the rear end of the pole a toothed sector fixed to the rear end of the arm, a rotatable shaft mounted on the carriage-frame, a gear-wheel on said shaft and means for actuating the shaft, standards fixed to the sides of the carriage-frame, a hopper having an inclined bottom fixed to the standards and platforms fixed to the sides of the carriage-frame to extend outward from the standards, arranged and combined to operate in the manner set forth for the purposes stated.

4. In a potato cutter and planter, a horizontal reciprocating cutter-carrier having fixed cutters, a grooved cam-wheel on a rotatable axle, a lever pivoted to the carriage-frame and the short arm of the lever extended into the cam and the long arm slidably and pivotally connected with the cutter-carrier, arranged and combined to operate in the manner set forth for the purposes stated.

5. In a potato cutter and planter, a horizontal reciprocating cutter-carrier having fixed cutters, a grooved cam-wheel on a rotatable axle, a lever pivoted to the carriage-frame and the short arm of the lever extended into the cam and the long arm slidably and pivotally connected with the cutter-carrier, and plates fixed to the end portions of the cutter-carrier to retain potatoes in position to be engaged by the fixed cutters on the end portions of the said carrier, arranged and combined to operate in the manner set forth for the purposes stated.

6. In a potato cutter and planter, a horizontal reciprocating cutter-carrier having fixed cutters, a grooved cam-wheel on a rotatable axle, a lever pivoted to the carriage-frame and the short arm of the lever extended into the cam and the long arm slidably and pivotally connected with the cutter-carrier, plates fixed to the end portions of the cutter-carrier to retain potatoes in position to be engaged by the fixed cutters on the end portions of the said carrier and platforms having open-ended potato-conveyers fixed above the said potato-cutters, arranged and combined to operate in the manner set forth for the purposes stated.

7. In a potato cutter and planter, a horizontal reciprocating cutter-carrier having fixed cutters, a grooved cam-wheel on a rotatable axle, a lever pivoted to the carriage-frame and the short arm of the lever extended into the cam and the long arm slidably and pivotally connected with the cutter-carrier, plates fixed to the end portions of the cutter-carrier to retain potatoes in position to be engaged by the fixed cutters on the end portions of the said carrier, platforms having open-ended potato-conveyers fixed above the said fixed potato-cutters, arranged and combined to operate in the manner set forth for the purposes stated.

8. In a potato cutter and planter, a horizontal reciprocating cutter-carrier having fixed cutters, a grooved cam-wheel on a rotatable axle, a lever pivoted to the carriage-frame and the short arm of the lever extended into the cam and the long arm slidably and pivotally connected with the cutter-carrier, plates fixed to the end portions of the cutter-carrier to retain potatoes in position to be engaged by the fixed cutters on the end portions of the said carrier, platforms having open-ended potato-conveyers fixed above the said fixed potato-cutters, a reciprocating potato-carrier mounted on top of said platform and means for actuating said potato-carrier and a hopper above the said potato-carrier for feeding potatoes to said potato-carrier, arranged and combined to operate in the manner set forth for the purposes stated.

9. In a potato cutter and planter, a reciprocating potato-carrier, a cam-wheel fixed to the rotatable axle of a carriage, a lever pivotally connected with the carriage-frame and its front end connected with the reciprocating potato-carrier and its rear end provided with a cross-head and rollers journaled to the end of the cross-head to engage cam-surfaces at the sides of the cam-wheel, arranged and combined to operate in the manner set forth for the purposes stated.

JOHN J. PUTNEY.

Witnesses:
   J. P. TURNER,
   B. H. SHINBUR.